(12) United States Patent
Pizot et al.

(10) Patent No.: US 9,058,147 B2
(45) Date of Patent: Jun. 16, 2015

(54) PRINTER EVENT SUBSCRIPTION

(71) Applicant: Hewlett-Packard Development Company, L.P., Fort Collins, CO (US)

(72) Inventors: Laurent Pizot, Camas, WA (US); Sudhindra Venkatesh Kulkarni, Bangalore Karnataka (IN); Rodney Hofer, Vancouver, WA (US); Nikhilesh Gargi, Gurgaon (IN); Amandeep Batra, Chandigarh (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 52 days.

(21) Appl. No.: 13/778,061

(22) Filed: Feb. 26, 2013

(65) Prior Publication Data

US 2014/0240755 A1  Aug. 28, 2014

(51) Int. Cl.
 *G06F 3/12* (2006.01)
(52) U.S. Cl.
 CPC .................... *G06F 3/1294* (2013.01)
(58) Field of Classification Search
 CPC .......... H04N 1/00127; H04N 1/00204; H04N 1/00244; G06F 3/06; G06F 3/12; G06F 3/1224; G06F 3/1237; G06F 3/1238; G06F 3/1259; G06F 3/1285; G06F 3/1288; G06F 3/1293; G06F 3/1294
 USPC .................. 358/1.1, 1.14, 1.15, 434
 See application file for complete search history.

(56) References Cited

U.S. PATENT DOCUMENTS

| | | | |
|---|---|---|---|
| 6,748,471 B1 | 6/2004 | Nourbakhsh et al. | |
| 7,640,551 B2 | 12/2009 | Obert | |
| 2003/0046122 A1 | 3/2003 | Seymour | |
| 2008/0079989 A1 | 4/2008 | Agnetta et al. | |
| 2008/0307480 A1 | 12/2008 | Chiba et al. | |
| 2012/0133974 A1 | 5/2012 | Nakamura et al. | |
| 2012/0194864 A1 | 8/2012 | Oshima et al. | |
| 2014/0002845 A1* | 1/2014 | Gutnik et al. | 358/1.14 |
| 2014/0006597 A1* | 1/2014 | Ganguli et al. | 709/224 |
| 2014/0204412 A1 | 7/2014 | Pizot et al. | |

OTHER PUBLICATIONS

Angel Machin, "Integrating Mobile Services and Content with the Internet", Apr. 21-25, 2008, http://www2.research.att.com/~rjana/MobEA2008/final/MobEA2008-01.pdf.
The Browser Sends an Event to the Server Through XMPP?, Retrieved from Internet Feb. 26, 2013, http://php.bigresource.com/The-browser-sends-an-event-to-the-server-through-XMPP-M5hMUDOLa.html.
Akshay Kannan, et al., "Google Cloud Print," Google I/O 2012, https://docs.google.com/presentation/d/1mHAat8NqRyq9yMKcEw3QPsmzz3J1ido0u3KO5upRcTA/present?pli=1&ueb=true#slide=id.g14997667_2_282.

* cited by examiner

*Primary Examiner* — Thomas D Lee
(74) *Attorney, Agent, or Firm* — Hewlett-Packard Department (57) ABSTRACT

A printing device is registered at a cloud server and a secure connection is established with the printing device. A subscription packet is sent to the printing device. The subscription packet specifies at least one event to be reported by the printing device. A notification that indicates an occurrence of the at least one event is received from the printing device.

15 Claims, 5 Drawing Sheets

PRINTER EVENT SUBSCRIPTION

BACKGROUND

Web-connected printers enable users to print content from the web by using a unique e-mail assigned to a printer. For example, web-connected printers enable users to print, copy, scan, or fax documents received over the Internet from an external source e.g., a smartphone). Further, multiple web-connected printers may be managed and controlled over the Internet.

BRIEF DESCRIPTION OF THE DRAWINGS

The following detailed description references the drawings, wherein.

DETAILED DESCRIPTION

Various aspects of the present disclosure are directed to printer event subscription. More precisely, various aspects of the present disclosure are directed to subscribing to one or more events generated at a printing device over a secure connection. For example, a cloud server that manages and provides cloud based services to a printing device may be interested in knowing when a new cartridge insertion has occurred or when a language settings change has occurred in the printing device. Such events may be useful to a user, thr example.

Web-connected printers such as Hewlett-Packard Corporation's ePrint-enabled printers are provided with a wide range of services from the ePrint cloud infrastructure. For example, a service provided by the ePrint includes email printing service, where an email address is assigned to a user's printing device. To print, the user simply sends an email containing the document to the printing device's address. Other ePrint services include downloadable print apps that allow users to print content from the Internet with a few clicks, and scan based services (e.g., scan2email). Because the cloud infrastructure enables access to web-connected printers over the Internet, users may access a plurality of printers anywhere from any Internet connected device (e.g., a smartphone).

Several events may be generated at the printing device for which the cloud infrastructure (or a user) needs to be aware of in real time, for example. Examples of events generated at a printing device may include a new cartridge insertion, a language settings change, changes in capabilities of the printing device, or a firmware/hardware upgrade. Current solutions may not provide a secure and scalable real time event notification solution for printing devices to report events over the Internet. For example, a current solution involves the cloud server polling the printing devices for updates on events. This solution may not be scalable due to the increasing number of printing devices that are registered with the cloud server.

Accordingly, examples disclosed herein provide a solution for providing real time event notifications to a cloud server in a secure manner. For example, the printing device may advertise events to the cloud server (and the user as they occur. Moreover, the cloud server controls event subscriptions to the printing devices, thereby providing scalability where multiple printing devices are registered or connected to the cloud server. Further, the disclosed examples enable secure event notification over the Internet without firewall restrictions, because the printing devices publish the events over a secure connection with the cloud server.

In one example, a cloud server computing device includes a processor to register a printing device, and to establish a secure connection with the printing device. The processor is to send a subscription packet to the printing device, where the subscription packet specifies at least one event to be reported by the printing device. The process is further to receive a notification from the printing device that indicates an occurrence of the at least one event.

In another example, a method of subscribing to events generated at a printing device includes registering a printing device at a cloud server and establishing a secure connection with the printing device. The method includes sending a subscription packet to the printing device via the secure connection, where the subscription packet specifies at least one event to be reported by the printing device. The method also includes receiving a notification from the printing device indicating an occurrence of the at least one event.

In another example, a non-transitory computer-readable medium includes instructions that, when executed by a processor in a printing device, cause the printing device to register with a cloud server and receive a device identification. The instructions are executable to establish a secure connection with the cloud server and to receive an event subscription packet from the cloud server, where the event subscription packet specifies at least one event to be reported by the printing device. The instructions are further executable to send a notification packet to the cloud server, where the notification packet indicates an occurrence of the at least one event.

As used herein, an "event" refers to a change in the state of a resource of a printing device or a request thr processing (e.g., a job). An occurrence of the event is known to an event producer (e.g., the printing device) and may be of potential interest to an event consumer the cloud server). Further, an event may be "persistent" or "transient." A "persistent event" is a critical event for which the cloud server is always subscribed. Persistent events may include firmware upgrade, country change, language change, addition of a new feature, and hardware additions at the printing device, for example. A "transient event" is an event which the cloud server is interested in only when the event is of importance due to an action performed by the cloud server for that period of time. A transient event may include a job status, thr example. To illustrate, a job status may be important only when a job is submitted to the printing device by the cloud server/user, A "notification" is a message sent to indicate an event has occurred. One or more notifications may be sent by the printing device and received or retrieved by one or more cloud servers, A "subscription" represents the relationship between the cloud server and the printing device including any filtering parameters and relevant policy and context information.

Figure 1:
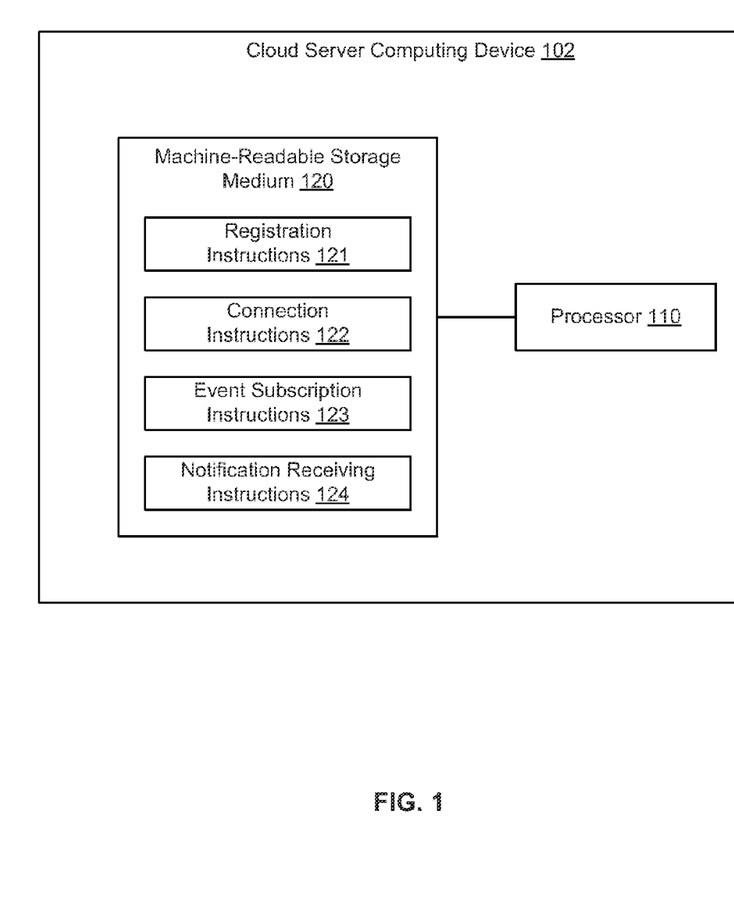
FIG. 1 is a block diagram of a cloud server computing device, according to one example.

FIG. 1 depicts a block diagram of a cloud server computing device, according to one example. Cloud server computing device 102 is a cloud infrastructure for providing cloud services to a plurality of web-connected printing devices such as printing device 202 of FIG. 2. Cloud server 102 may also remotely manage the plurality of printing devices over the Internet. For example, cloud server 102 may provide printing devices with services such as email printing services, downloadable printing apps usable for printing content from the Internet, scan based services (e.g., scan2email service), and cloud registration and management services. Further, cloud server 102 may send print jobs, scan jobs, and facsimile jobs to the printing device from a user device (e.g., a smartphone). In the example of FIG. 1, cloud server 102 includes a processor 110 and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 121, 122, 123, and 124 to enable printer event subscription, as described below. As an alternative, or in addition to retrieving and executing instructions, processor 110 may include one or more electronic circuits comprising a number of electronic components for performing the functionality of one or more instructions 121-124.

Machine-readable storage medium 120 may be an electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for enabling printer event subscription.

Registration instructions 121 may register a printing device with the cloud server 102. In certain examples, during registration, the cloud server 102 provides the printing device with a device identification (device ID). The device ID may be unique to the printing device and may include a Jabber ID or any other unique ID associated with the printing device. A Jabber ID is an open technology for instant messaging and protocol. Thus, a user may register their web-connected printing device with cloud server 102 and receive a Jabber ID usable for communicating with the cloud server 102.

Connection instructions 122 may establish a secure connection with the printing device. In certain examples, the secure connection may be initiated by the printing device using the device ID. However, the secure connection may also be initiated by the cloud server 102. In some examples, the secure connection is an extensible messaging and presence protocol (XMPP). An XMPP is a communications protocol for message-oriented middleware based on extensible markup language (XML). In some examples, the XMPP connection is a persistent XMPP connection (i.e., keep-alive or reuse) that forms the core of communication between the cloud server 102 and the printing device. It should be noted however that other secure connection protocols may be utilized.

Event subscription instructions 123 may send a subscription packet to the printing device. The subscription packet specifies at least one event to be reported by the printing device. In some examples, the subscription packet may specify at least one persistent/critical event to be reported by printing device. In other examples, the subscription packet may include at least one transient event to be reported by the printing device.

A persistent/critical event may include a device capabilities change such as a firmware upgrade, country change, language change, addition of a new feature, hardware additions, addition of a tray, and an accessory addition; or a consumable event such as a new cartridge insertion. In certain examples, the cloud server 102 is always subscribed to persistent events (e.g., implicitly during registration). For example, cloud server 102 may be automatically subscribed (or pre-subscribed) to persistent events during registration of the printing device with the cloud server 102. To illustrate, when a user registers their printing device with cloud server 102, the cloud server 102 is subscribed to events such as firmware upgrades, new cartridge insertion, hardware or accessory addition, etc. Accordingly, cloud server 102 does not send a subscription packet for such events as they are automatically subscribed to. It should be noted that cloud server 102 may unsubscribe or cancel subscription to persistent events at any time. Moreover, event subscriptions may be modified by the cloud server 102.

A transient event may include a job status or other specifically requested events by the cloud server 102. In some examples, a transient event may not be reported unless explicitly requested by the cloud server 102. For example, a job status subscription may be sent by the cloud server 102 when a job (e.g., print, fax, scan, etc.) is submitted to the printing device. Thus, transient events may be subscribed to on a need basis.

In certain examples, the subscription packet is sent via an in-band bytestream (IBB) session initiated by the cloud server 102 over the secure connection. An IBB session enables two devices to establish a virtual bytestream over which encoded chunks of data may be exchanged over XMPP. In some examples, the subscription packet is an HTTP subscription packet, where an HTTP request/response protocol is utilized.

Notification receiving instructions 124 may receive a notification from the printing device that indicates an occurrence of the at least one event. Once the printing device registers the subscription, the printing device reports an occurrence of the event to the cloud server 102. In some examples, the notification is sent via another IBB session initiated by the printing device. The IBB session may be a second IBB session different from the first IBB session that was initiated by the cloud server 102 to send the subscription packet. Thus, the printing device notifies the cloud server 102 that the event (persistent or transient) has occurred via an IBB session over the secured connection. In certain examples, the printing device may notify the cloud server 102 of a URL where the cloud server 102 would connect to retrieve event updates. To illustrate, the printing device may send a notification packet to the cloud server 102, where the notification packet includes a URL, associated with a content delivery network (CDN) where event updates are published. Thus, the cloud server 102 may connect to the CDN to retrieve event updates.

By implementing a subscription based event notification, cloud server 102 may receive real time even notification on events of interest to the cloud server 102. Further, the described implementation provides a scalable approach where the cloud server 102 controls the subscription to printing devices, thereby enabling the cloud server 102 to manage multiple printing devices. Moreover, because event notifications are initiated by the printing device (e.g., via an IBB session over a secure connection), firewall restrictions may be traversed in a secure manner.

Figure 2:
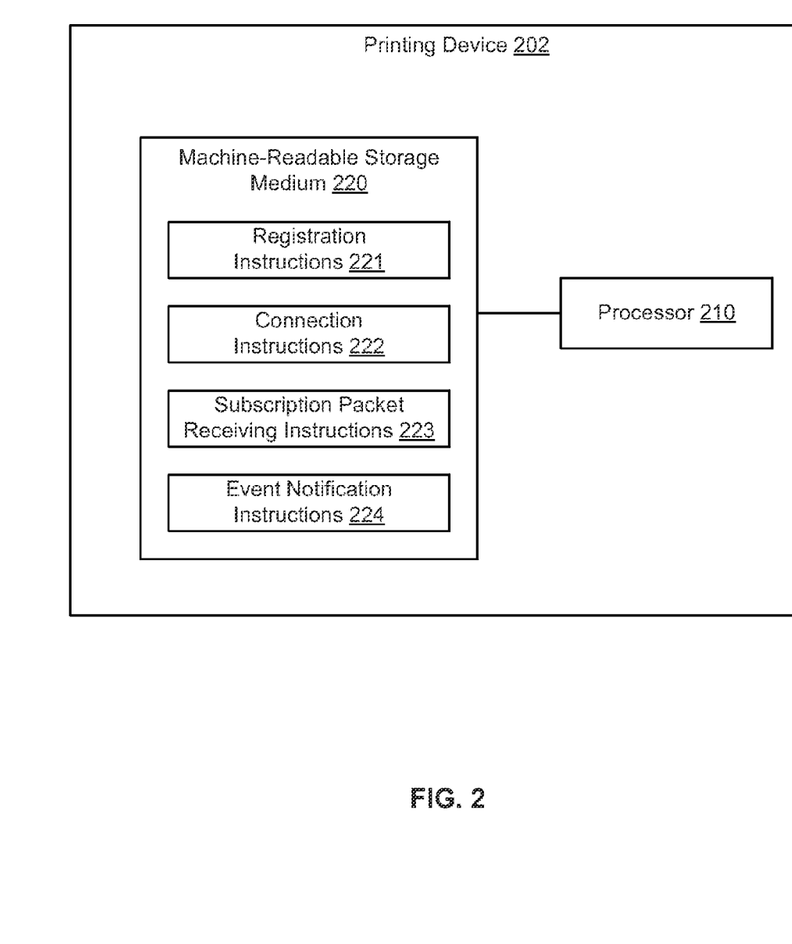
FIG. 2 is a block diagram of a printing device, according to one example.

FIG. 2 is a block diagram of a printing device, according to one example. Printing device 202 is a web-connected printing device. For example, printing device 202 may be registered with a cloud server (e.g., cloud server 102 of FIG. 1) and may rely on the cloud server for cloud services and solutions over the Internet. Printing device 202 may include one or more of a multifunction printer (MFP), an all-in-one (AIO), or other web-connected printing devices. In the example of FIG. 2, printing device 202 includes a processor 210 and a machine-readable storage medium 220.

Processor 210 may be one or more central processing units (CPUs), microprocessors, and/or other hardware devices suitable for retrieval and execution of instructions stored in machine-readable storage medium 220. Processor 210 may fetch, decode, and execute instructions 221, 222, 223, and 224 to enable event subscription, as described below. As an alternative, or in addition to retrieving and executing instructions, processor 210 may include one or more electronic circuits comprising a number of electronic components for performing the functionality of one or more instructions 221-224.

Machine-readable storage medium 220 may be an electronic, magnetic, optical, or other physical storage device that stores executable instructions. Thus, machine-readable storage medium 220 may be, for example, Random Access Memory (RAM), an Electrically-Erasable Programmable Read-Only Memory (EEPROM), a storage drive, an optical disc, and the like. As described in detail below, machine-readable storage medium 220 may be encoded with executable instructions for enabling event subscription.

Registration instructions 221 may register printing device 202 with a cloud server and receive a device identification. For example, printing device 202 may be provided with a Jabber ID or any other unique ID for identifying the printing device 202 with the cloud server. Further, the Jabber ID may be usable for communicating with the cloud server. For example, printing device 202 may be authenticated at the cloud server using the Jabber ID.

Connection instructions 222 may establish a secure connection with the cloud server. Further, connection instructions 222 may initiate communication sessions (e.g., IBB communication sessions) for sending data packets to the cloud server over the secure connection. In some examples, the secure connection is an XMPP connection.

Subscription packet receiving instructions 223 may receive an event subscription packet from the cloud server, where the event subscription packet specifies at least one event to be reported by the printing device 202. In some examples, the event subscription packet specifies at least one persistent event (e.g., firmware upgrade, hardware addition, etc.) event to be reported by the printing device 202. In other examples, the event subscription packet specifies at least one transient event (e.g., job status) to be reported by the printing device 202. In certain examples, the subscription packet is an HTTP subscription packet received from the cloud server via a first IBB session initiated by the cloud server. Once received, the subscription packet may be registered/stored at the printing device 202. Accordingly, the subscription packet instructs the printing device 202 to report occurrences of the events indicated in the subscription packet.

Event notification instructions 224 may send a notification packet to the cloud server, where the notification packet indicates an occurrence of the at least one event. For example, when the event occurs at the printing device (e.g., a firmware upgrade), event notification instructions 224 may initiate a second IBB session to send the notification packet to the cloud server. In certain examples, the notification packet is a remote address where the cloud server may retrieve event occurrences. To illustrate, the printing device 202 may publish event updates at a CDN and provide an address or URL to the cloud server. Thus, the cloud server may retrieve event updates from the CDN (or the URL), thereby reducing the burden of storing event updates at the printing device 202. Once the notification packet is sent to the cloud server, printing device 202 may close the second IBB session.

Figure 3:
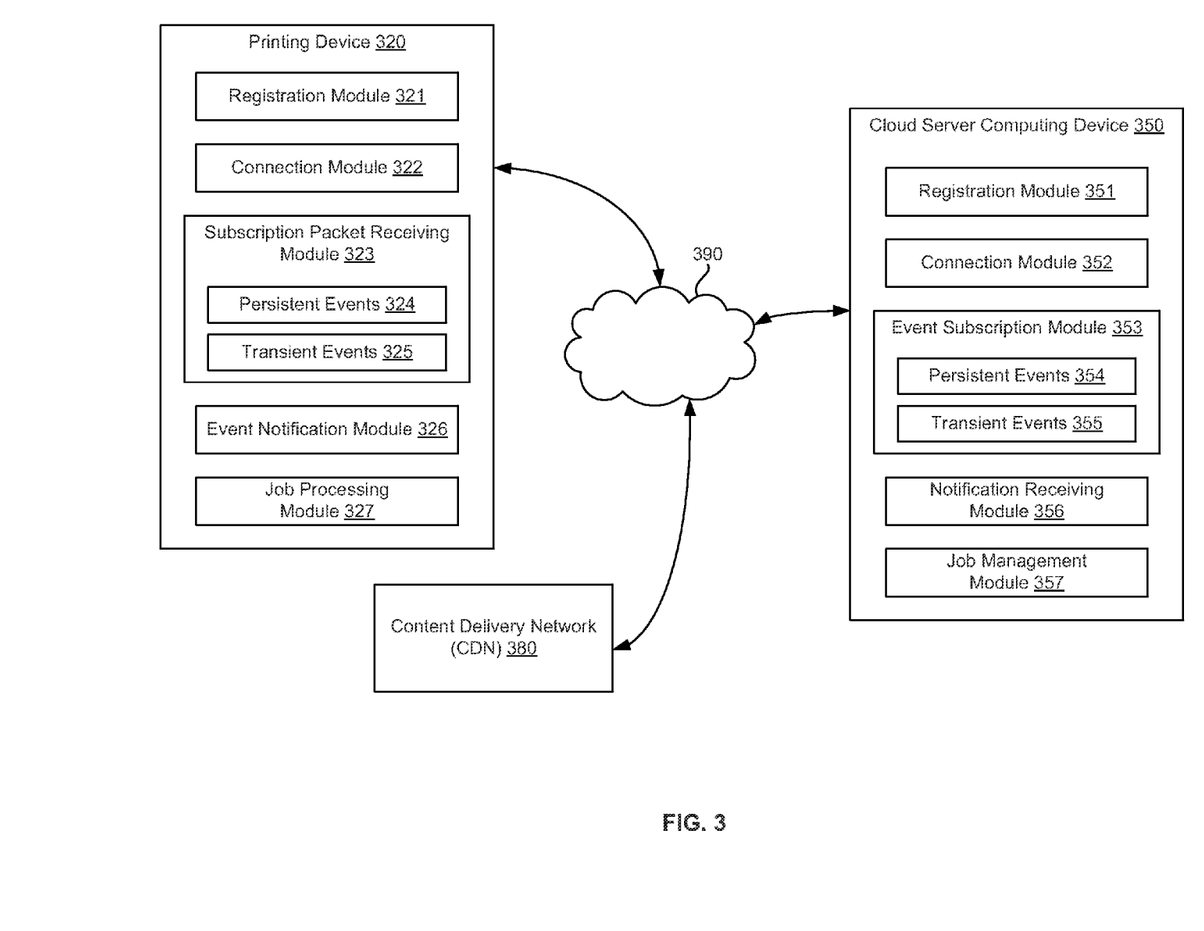
FIG. 3 is a block diagram of a cloud server computing device for subscribing to an event generated at a printing device, according to one example.

FIG. 3 is a block diagram of a cloud server computing device for subscribing to an event generated at a printing device, according to one example. As illustrated in FIG. 3 and described below, cloud server 350 may communicate with printing device 320 and with CDN 380 to subscribe to events and to retrieve event notifications.

As illustrated, printing device 320 may include a number of modules 321-327, while cloud server 350 may include a number of modules 351-357. Each of the modules may include a series of instructions encoded on machine-readable storage medium and executable by a processor of the respective devices 320, 350. In addition or as an alternative, each module may include one or more hardware devices including electronic circuitry for implementing the functionality described below.

As with printing device 202 of FIG. 2, printing device 320 may be a web-connected printing device such as an AIO or an MFP for executing the functionality described below. As detailed below, printing device 320 may include a series of modules 321-327 for receiving event subscriptions from cloud server 350 and for providing event notifications to cloud server 350.

Registration module 321 may register printing device 320 with cloud server 350. During registration, printing device 320 may receive a device ID (e.g., a Jabber ID) from cloud server 350. The device ID may be usable for communicating with the cloud server 350 and for receiving cloud services and solutions from cloud server 350.

Connection module 322 may establish a secure connection with cloud server 350. For example, connection module 322 may establish an XMPP connection with cloud server 350. In some examples, connection module may establish an IBB session with cloud server 350 to send and/or receive data packets (e.g., subscription packets and notification packets).

Subscription packet receiving module 323 may receive an event subscription packet from cloud server 350. The event subscription packet may specify at least one event to be reported by the printing device 320. For example, the event subscription packet may specify a persistent event 324 and/or a transient event 325. Thus, subscription packet receiving module 323 may register the subscription packet and determine the events to be reported.

In some examples, the subscription packet may be included in a job request submitted by the cloud server. In such examples, job processing module 327 may process the job request (e.g., print job, scan job, fax job, etc) and forward the subscription packet to the subscription packet receiving module 323.

Event notification module 326 may send a notification packet to the cloud server when the at least one event occurs. For example, when the job request has been processed by the job processing module 327, the event notification packet may include a job status update. In other examples, when a persistent (e.g., firmware upgrade) has occurred at the printing device, a notification packet may be sent to the cloud server 350. In some examples, event notification module 326 may initiate a second IBB session to send the notification packet to the cloud server 350. In certain examples, event occurrences may be published at CDN 380. In such examples, the notification packet may include an address or URL of CDN 380 where the cloud server 350 may retrieve event updates.

As with cloud server 102 of FIG. 1, cloud server 350 of FIG. 3 may be any server accessible to printing device 320 over the Internet 390 that is suitable for executing the functionality described below. As detailed below, server 350 may include a series of modules 351-357 for subscribing to events at printing device 320 and for receiving notification of such events.

Registration module 351 may register printing device 320 at the cloud server 350 and assign a device ID (e.g., Jabber ID) to the printing device 320. The Jabber ID may be usable by the printing device 320 for connection to the cloud server 350 and for accessing cloud services.

Connection module 352 may establish a secure connection with printing device 320. For example, an XMPP connection may be established with the printing device 320. Further, IBB session may be initiated for transmitting subscription packets.

Event subscription module 353 may send a subscription packet to the printing device 320, where the subscription specifies at least one event to be reported by the printing device 320. For example, the subscription packet may include persistent events 354 and/or transient events 355. Further the subscription packet may be an HTTP-based subscription packet. In some examples, the subscription packet is sent via a first IBB session.

Notification receiving module 356 may receive a notification from the printing device 320, where the notification indicates an occurrence of the at least one event. The notification may be received from the printing device 320 via a second IBB session initiated by the printing device 320. In some examples, the notification may indicate that event updates are published at CDN 380 and may be retrieved from CDN 380.

Job management module 357 may receive one or more job requests from a user and send the job request to printing device 320 for processing. In certain examples, the user may be interested in the status of jobs submitted for processing. In such examples, cloud server 350 may include a job event subscription with the job request to the printing device 320. Accordingly, a notification may be received from the printing device 320 reporting the job status.

Figure 4:
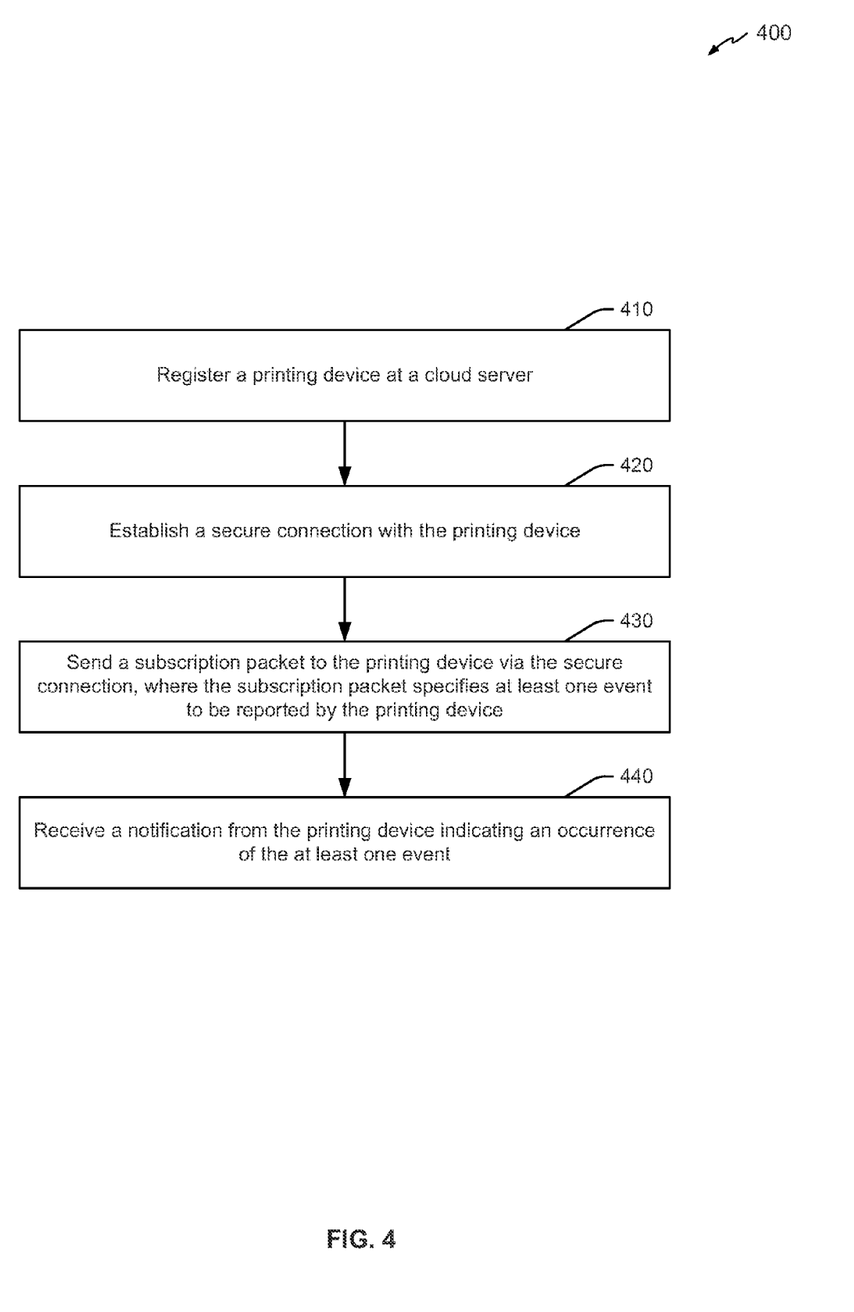
FIG. 4 is a flowchart of a method of enabling printer event subscription, according to one example.

FIG. 4 is a flowchart of a method 400 of enabling printer event subscription, according to one example. Although execution of method 400 is described below with reference to the components of cloud servers 102 and 350 of FIGS. 1 and 3, respectively, other suitable components for execution of method 400 will be apparent to those of skill in the art. Additionally, the components for executing method 400 may be spread among multiple devices. Method 400 may be implemented in the form of executable instructions stored on a machine-readable storage medium, such as non-transitory machine-readable storage medium 120 of FIG. 1, and/or in the form of electronic circuitry.

Method 400 includes registering a printing device at a cloud server, at 410. For example, registration instructions 121 and registration module 351 may register the printing device and provide the printing device with a device ID (e.g., a Jabber ID). It should be noted that multiple printing devices may be cloud-registered.

Method 400 also includes establishing a secure connection with the printing device, at 420. For example, connection instructions 122 or connection module 352 may establish an XMPP connection with the printing device.

Method 400 includes sending a subscription packet to the printing device via the secure, where the subscription packet specifies at least one event to be reported by the printing device, at 430. For example, event subscription instructions 123 or event subscription module 353 may send a subscription packet that includes events of interest to the cloud server 102/350. The subscription packet may be sent via a first IBB session.

Method 400 includes receiving a notification from the printing device indicating an occurrence of the at least one event, at 440. For example, notification receiving instructions 124 or notification receiving module 356 may receive a notification packet from printing device 202/320 via a second IBB session. In certain examples, the notification packet may include an address associated with CDN 380 where event updates are published and may be retrieved by the cloud server 102/350.

Figure 5:
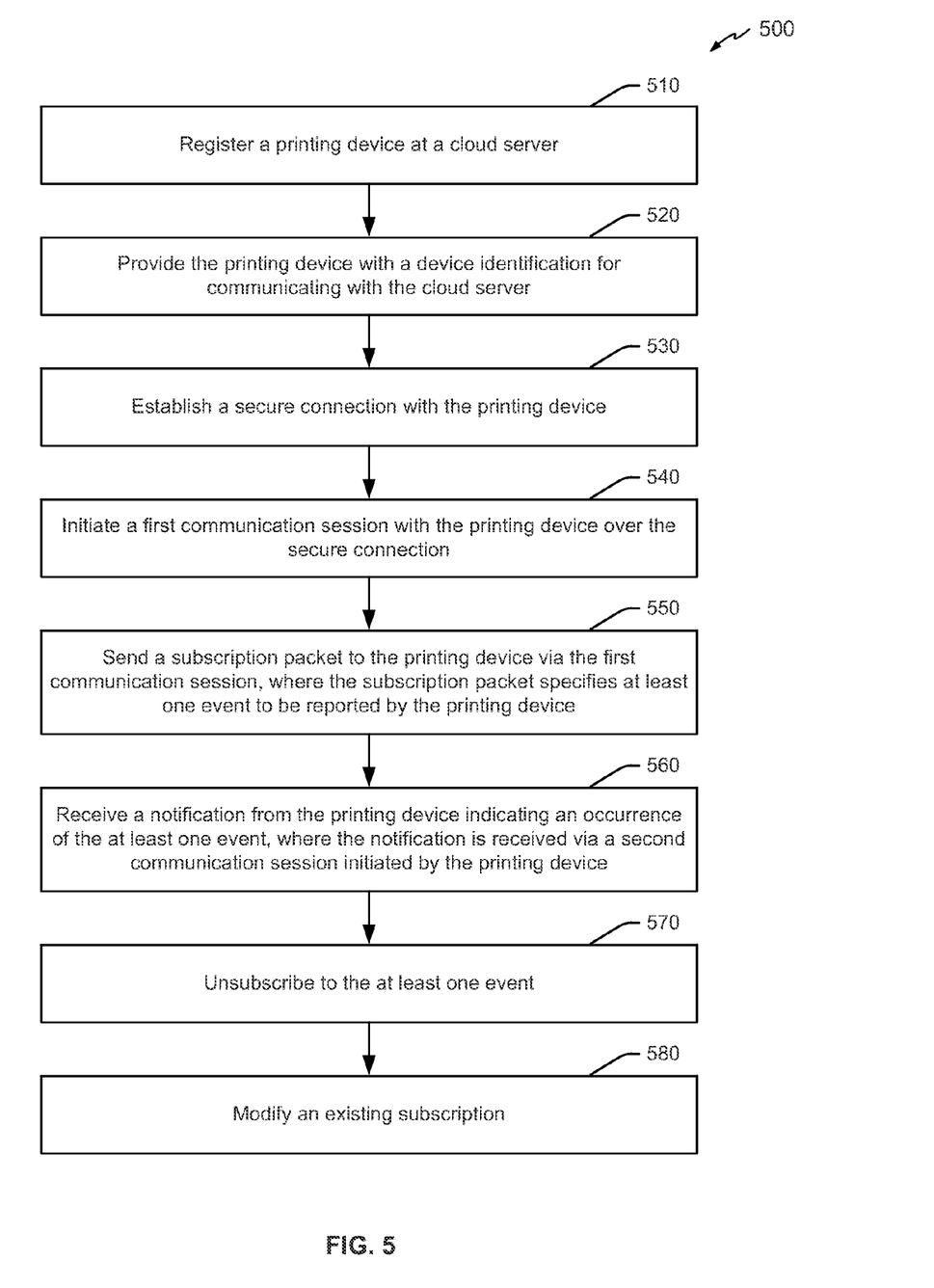
FIG. 5 is a flowchart of a method of enabling printer event subscription, according to one example.

FIG. 5 is a flowchart of a method 500 of enabling printer event subscription, according to one example. Although execution of method 500 is described below with reference to the components of cloud servers 102 and 350 of FIGS. 1 and 3, respectively, other suitable components for execution of method 500 will be apparent to those of skill in the art. Additionally, the components for executing method 500 may be spread among multiple devices. Method 500 may be implemented in the form of executable instructions stored on a machine-readable storage medium, such as non-transitory machine-readable storage medium 120 of FIG. 1, and/or in the form of electronic circuitry.

Method 500 includes registering a printing device at a cloud server, at 510. For example, registration instructions 121 and registration module 351 may register a printing device. Multiple printing devices may be registered with the cloud server 102/350 to receive cloud based services and solutions Method 500 includes providing the printing device with a device identification, at 520. For example, registration instructions 121 and registration module 351 may assign each printing device with a unique device ID (e.g., Jabber ID) usable for communicating with the cloud server 102/350.

Method 500 includes establishing a secure connection with the printing device, at 530. For example, connection instructions 122 or connection module 352 may establish an XMPP connection with the printing device.

Method 500 includes initiating a first communication session with the printing device over the secure connection, at 540. For example, connection instructions 122 or connection module 352 may initiate a first IBB session over the XMPP connection.

Method 500 includes sending a subscription packet to the printing device via the first communication session, where the subscription packet specifies at least one event to be reported by the printing device, at 550. For example, event subscription instructions 123 or event subscription module 353 may send a subscription packet to the printing device over the first IBB session.

Method 500 includes receiving a notification from the printing device indicating an occurrence of the at least one event, where the notification is received via a second communication session initiated by the printing device, at 560. For example, notification receiving instructions 124 or notification receiving module 356 may receive a notification packet from printing device 202/320 via a second IBB session. In certain examples, the notification packet may include an address associated with CDN 380 where event updates are published and may be retrieved by the cloud server 102/350.

Method 500 includes unsubscribing to the at least one event, at 570. For example, event subscription instructions 123 or event subscription module 353 may unsubscribe to events no longer of interest to the cloud server 102/350. Once unsubscribed, the cloud server 102/350 may not receive notifications about occurrences of the unsubscribed events. In some examples, cloud server 102/350 may inform the printing device of its desire to unsubscribe to events via the first IBB session.

Method 500 also includes modifying an existing subscription, at 580. For example, event subscription instructions 123 or event subscription module 353 may modify an existing subscription. In one scenario, rather than creating a new subscription packet, cloud server 102/350 may modify an existing subscription packet, for example, to add new events or to delete events. In another scenario, an existing subscription packet may be modified to include retry duration parameters. To illustrate, cloud server 102/350 may instruct printing device 202/320 to retry after a specific length/duration of time (e.g., 2 hrs, 24 hrs) if a connection to the cloud server 202/320 is not available to report occurrence of events.

In the foregoing description, numerous details are set forth to provide an understanding of the present disclosure. However, it will be understood by those skilled in the art that the present disclosure may be practiced without these details. While the disclosure has been described with respect to a limited number of examples, those skilled in the art will appreciate numerous modifications and variations therefrom. It is intended that the appended claims cover such modifications and variations as fall within the true spirit and scope of the disclosure.

What is claimed is:

1. A cloud server computing device, comprising:
    a processor to:
        register a printing device;
        establish a secure connection with the printing device;
        send a subscription packet to the printing device, wherein the subscription packet specifies at least one event of a persistent event and a transient event that is to be reported by the printing device, and wherein the transient event comprises a job status event that is included in a job submitted to the printing device; and
        receive a notification from the printing device that indicates an occurrence of the at least one event.

2. The cloud server computing device of claim 1, wherein during registration, the processor to provide printing device with a device identification usably by the printing device to communicate with the cloud server.

3. The cloud server computing device of claim 1,
    wherein the subscription packet is sent via a first in-band byte stream (IBB) session initiated by the cloud server over the secure connection,
    wherein the notification is received via a second IBB session initiated by the printing device over the secure connection, and
    wherein the secure connection comprises an extensible messaging and presence protocol (XMPP).

4. The cloud server computing device of claim 3, the processor further to unsubscribe to the at least one event via the first IBB session.

5. The cloud server computing device of claim 1, wherein the persistent event comprises at least one of a device capabilities change event and a consumable event.

6. The cloud server computing device of claim 5,
    wherein the device capabilities change event comprises at least one of a firmware upgrade, a country change, a language setting change, a new feature addition, and a hardware or accessory addition, and
    wherein the consumable event comprises at least one of a new cartridge insertion and an ink level.

7. The cloud server computing device of claim 1, wherein the subscription packet comprises a hypertext transfer protocol (HTTP) subscription packet.

8. A method of subscribing to events generated at a printing device, comprising:
    registering a printing device at a cloud server;
    establishing a secure connection with the printing device;
    sending a subscription packet to the printing device via the secure connection, wherein the subscription packet specifies at least one event to be reported by the printing device;
    receiving a notification from the printing device indicating an occurrence of the at least one event;
    unsubscribing to the at least one event; and
    modifying an existing subscription.

9. The method of claim 8, wherein registering the printing device comprises providing the printing device with a device identification for communicating with the cloud server.

10. The method of claim 8, wherein sending the subscription packet comprises:
    initiating a first communication session over the secure connection; and
    sending the subscription packet over the first communication session.

11. The method of claim 8, wherein notification is received via a second communication session over the secure connection, wherein the second communication session is initiated by the printing device.

12. A non-transitory computer-readable medium comprising instructions that, when executed by a processor of a printing device, cause the printing device to:
    register with a cloud server and receive a device identification;
    establish a secure connection with the cloud server;
    receive a job request from the cloud server, wherein the job request includes a job status subscription and an event subscription packet that specifies at least one event to be reported by the printing device;
    process the job request; and
    send the notification packet to the cloud server, wherein the notification packet indicates an occurrence of the at least one event and comprises a job status update.

13. The non-transitory computer-readable medium of claim 12, wherein the event subscription packet is received via a first communication session initiated by the cloud server.

14. The non-transitory computer-readable medium of claim 13, the instructions further executable by the processor to:
    initiate a second communication session with the cloud server;
    send the notification packet via the second communication session; and
    close the second communication session.

15. The non-transitory computer-readable medium of claim 13, the instructions further executable by the processor to provide the cloud server with a uniform resource locator (URL) where the cloud server is to connect to retrieve the notification packet.

* * * * *